(12) United States Patent
Tam

(10) Patent No.: US 6,411,969 B1
(45) Date of Patent: Jun. 25, 2002

(54) ENHANCED SYSTEM AND METHOD FOR MANAGEMENT OF SYSTEM DATABASE UTILITIES

(75) Inventor: Marge Tam, Newport Beach, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/374,351

(22) Filed: Aug. 13, 1999

(51) Int. Cl.[7] .............................................. G06F 17/30
(52) U.S. Cl. ...................... 707/204; 707/202; 707/205; 711/161; 711/162
(58) Field of Search ................................. 707/204, 201, 707/205, 203, 202, 101; 711/118–146, 161–162

(56) References Cited

U.S. PATENT DOCUMENTS

| | | | | |
|---|---|---|---|---|
| 5,440,692 A | * | 8/1995 | Janicek ........................ 707/101 |
| 5,497,483 A | * | 3/1996 | Beardsley et al. .............. 714/1 |
| 5,579,503 A | * | 11/1996 | Osborne ....................... 711/119 |
| 5,673,381 A | * | 9/1997 | Huai et al. ..................... 714/1 |
| 5,794,242 A | * | 8/1998 | Green et al. ................... 707/10 |
| 5,806,074 A | * | 9/1998 | Souder et al. ................ 707/201 |
| 5,873,101 A | * | 2/1999 | Klein ........................... 707/204 |
| 5,893,117 A | * | 4/1999 | Wang .......................... 707/203 |
| 5,974,425 A | * | 10/1999 | Obermarck et al. ......... 707/202 |
| 6,003,044 A | * | 12/1999 | Pongracz et al. ............ 707/204 |
| 6,055,546 A | * | 4/2000 | Pongracz et al. ............ 707/202 |
| 6,078,930 A | * | 6/2000 | Lee et al. .................... 707/202 |
| 6,078,990 A | * | 6/2000 | Frazier ........................ 711/114 |
| 6,088,705 A | * | 7/2000 | Lightstone et al. .......... 707/200 |
| 6,178,428 B1 | * | 1/2001 | Pystynen et al. ............ 707/205 |

* cited by examiner

Primary Examiner—John Breene
Assistant Examiner—Debbie M Le
(74) Attorney, Agent, or Firm—Alfred W. Kozak; Mark T. Starr; Lisa A. Rode

(57) ABSTRACT

An enhanced method for developing back-up copies of a source database by providing incremental and accumulate dump commands from various multiple-Users which enable a selection of certain files which are identified independently of time-factor for dumping selectively either onto a separate destination medium of disk or tape. A User can determine the block size of words for blocks of data files to be dumped onto the destination medium, thus significantly reducing the number of I/O operations required.

9 Claims, 8 Drawing Sheets

FIG. 1

FIG. 2  PROGRAM FLOW DIAGRAM

ENHANCED SYSTEM AND METHOD FOR MANAGEMENT OF SYSTEM DATABASE UTILITIES

CROSS-REFERENCES TO RELATED APPLICATIONS

This application is related to a co-pending Application, U.S. Ser. No. 09/322,535 entitled "Multi-Processor System for Data Base Management", and to a co-pending application, U.S. Ser. No. 374,352 entitled "Database Backup System and Method Utilizing Numerically Identified Files for Incremental Dumping" which are incorporated herein by reference.

FIELD OF THE INVENTION

This disclosure relates to improvements in the field of database back-up to disk and tape.

BACKGROUND OF THE INVENTION

In the operation of computer systems and networks, the computer data is often "backed-up", that is to say, it is copied to a storage medium other than the central computer's storage disk in order to permit the recovery of the data as the data existed at some point in time. This is done for purposes of diagnosis in the event of system failure or inadvertent loss of data.

It is often a standard practice to automatically back-up data on a daily or other periodic basis and store this data on tape or disk.

There are several ways to back-up data for diagnostic and recovery purposes. One way is considered as (i) physical level back-up. The physical level back-up refers to the data as it is stored at specific locations on some physical media, such as a host computer disk.

Another way is (ii) designated logical level back-up. This refers to the data as seen by the user application programs in files or in database tables. Normally, the operating system of the computer will include a file system that does mapping between the physical level and the logical level. On doing the physical level back-up, this would involve making a raw copy from a computer disk to some other storage medium without going through the file system or some other physical to logical interpreter module. Then on the other hand, the back-up using the logical level would involve using such a thing as an interpreter module or some sort of a file system while doing back-up of physical to logical mapping.

A Database management System consists of a set of tools used to develop and manage a database. The present system utilizes a DMSII which is a Database Management System available on the Unisys Corporation's ClearPath HMP NX, and the Unisys A-Series systems. A background for the Unisys DMSII systems is available in a publication of the Unisys Corporation, Document 8807 6625 000, entitled "Getting Started With DMSII" and published in September, 1997 by the Unisys Corporation. The DMSII Utilities provide database back-up and recovery capability for the entire database or for partial databases. The background operations of the DMSII utility enhancements are published in a Unisys Corporation publication Document 98037/4 and entitled "DMSII Utility Enhancements" published on Mar. 31, 1999.

Database back-ups can be accomplished for "on-line" and "off-line" bases. The on-line back-up will allow users to update data in the database, whereas the off-line back-up disallows all updates to the database. The back-ups can be done to either tapes or disks or any combination of both types of such media.

Database Management Systems are used by many large and small businesses such as airline reservation systems, financial institutions, retail chains, insurance companies, utility companies and government agencies. The present Database Management System (DMS) in its form as DMSII is used to build database structures for items of data according to some appropriate logical model, such as relational, hierarchical, or network. Further, the Database Management System is used to manage the database structures and keep the structures in some stable order while various application programs may be retrieving or changing the data. The present embodiment of DMSII has a data definition language designated as Data And Structure Definition Language (DASDL).

There are various tasks that are performed in database management and these involve (i) monitoring and optimizing database performance; (ii) the use of database control for monitoring multi-program database access; (iii) the function of the data integrity and safety done by integrity checking and preventing access to the same data by multiple applications occurring at the same time; (iv) the function of defining data structures and the data fields within them, including the function of modifying data structures; (v) data access operations and developing an application program to retrieve data or to change data; (vi) the function of data shareability to provide multi-program access without conflicts and provide database definitions to the application program; (vii) in database and data security, to prevent unauthorized database access; (viii) ensuring independence of application programs from certain data changes and preventing the revision of application programs every time a structure changes; (ix) in database and data recovery, performing the resumption of database operations after an interruption; (x) tracking data changes by keeping a record of every change made to the data; (xi) for data change integrity, ensuring that update changes are applied to, or removed from, the database in their entirety; (xii) providing a recent copy of the database as a reserve by backing-up the database and storing copies of audit files and all other database files; (xiii) providing for database scaleability by growing or shrinking the database according to the ongoing needs at the time.

The DMSII provides standard software files that perform services and operations for all the databases connected to the system's Enterprise Server. This enables a viewing of a list of all these files on the user terminal.

In the ordinary course of operations, the application program user will submit changes to data or retrieve data while running a particular application program. Then, changes can be made which add, modify and delete data. A Database Administrator (DBA) keeps the database running smoothly and enforces the rules for data integrity and security. Users access the database through a given application program which itself does not access the data directly. Instead, the program interacts with the DMSII software and the database tailored software, which is directed by the access routines of the Data Management System to provide accesses, retrievals and the storage of data in the physical database file.

In regard to access, an application user will access the data in order to (i) make an inquiry to get a Read of data in the database, or (ii) to provide an update by doing a Write to the database thus, adding, deleting or changing data. The access for either purpose contributes to an operation on the database which is called a "transaction".

A transaction is a sequence of operations grouped by a user program because the operations constitute a single logical change to the database, At the end and finality of the transaction point, the transaction is complete and without error, and it is considered as being committed to the database.

Actual real world data goes into special logical structures that are used by the Data Management System to store data. The database is designed to map categories of data into suitable structures. For example, the real world data would have a character with, structure called a "data set". An example of this would be a particular person's name. Then, real world data that can serve as an index of a whole data set has a structured name called a "set". This, for example, might be the social security number of any employee. Then there is data that can serve as an index of a data set under a certain condition, and this is called a "subset". This might be an employee's work number, for example. Then, there is data about each instance of a particular category and the structure name for this is "data item". An example of this might be the name and address of the category (person). Then, there is data related to the database as a whole, and this involves a structure called "global data item". An example of this might be the total number of employees in a company. Once there has been identification of the real-world data which is to be stored in the database, it is then necessary to define that data in relationship to the data structures of the data management system that holds data. When this data is defined within "structures", then the data management system and the system software programs an application program that can then understand how to make this data accessible for various inquiries and/or changes. This is done with the Data and Structure Definition Language (DASDL).

The Data Management System structures are the building blocks of the Data Management System database. Here, the "data set" has the purpose of storing data pertaining to a data category in a collection of records. A "set" has the purpose of indexing all records in a data set. A "subset" serves the purpose to index some records in a data set according to some given criteria. The "data item" is a structured name which defines a unit of information about a category in a given field (column) of a data set record. A "global data item" serves the purpose of storing a unit of information about the entire database or any of its involved structures. In general discussion about the types of data and the names of data structures, it is often seen that in a relational database, a "data set" is called a "table". A "set" or "subset" is frequently called an "index". A "data item" is often called a "field" or a "column", or is often called by its data name, for example, a project number. "Structures" are made of common file components designated as records and fields.

A record is a group of logically-related data items in a file. Often, a record is called a row. Data items reside in different fields in the records. For example, a record might involve a series of data such as an employee's name, the employee's I.D., the employee's social security number and years of employment. A group of such records would constitute a file.

The operating system which uses the data management system will treat the record as a unit. The system makes data available to users in records and not in individual single items of data. In programming languages, the record is the unit of data that the system reads from or writes to a file in one execution cycle of a Read or Write statement in a program.

If the application program wants to change a data item in a given record, the Data Management System brings a copy of the record from the physical storage over to memory, then enables that data item to be changed, and then writes the changed record back to the file.

A "field" is a consecutive group of bits or bytes within a particular component of a record which will represent a logical piece of data. A field or column is defined by the description of the data item it is to hold. For example, if one field carries the name of an employee, this field in the record could be called the name field.

The "data set" is a physical file, that is to say, a collection of related data records stored on a random-access storage device, such as a disk in which the data resides.

A data set is kept up-to-date in several ways: (i) here, application programs add, change, or delete individual pieces of data or records stored in the data set; (ii) the Database Administrator (DBA) maintains the structure of the data set by keeping the data set within certain maximized limits, by adding, deleting or changing the definition of a data item, creating new sets or subsets, monitoring automatic processes that guard data integrity and creating guard files to enhance the security of the data.

A "set" is a separate stored file that indexes all the records of a single data set. The Data Management System uses sets in order to locate records in a data set. A set has no meaning apart from its related data set. The set structure enables an application program to access all records of a data set in some logical sequence.

A "subset" can be considered identical to a set, except that the subset need not contain a record for every record of the data set. A subset is a file that indexes none, one, several, or all of the records in a data set. The subset structure enables an application program to access only records of a data set that meet a particularly required condition.

For example, an application program may compile a list of people who are "managers". Thus, it is seen that the database designer created the "manager" subset. Thus, in order to retrieve a record of managers, the data management system can use the smaller file, that is, the subset, to quickly point to the corresponding records in the larger file which is the data set. As with the set, the subset must also be kept up-to-date.

A "data item" is an element of data. In the Data Management System, a data item can also be the field (column) in the database record. For example, the social security number could be considered as a data item in the sample data set designated "person". The purpose of the data item is to describe the data to be stored. The data item provides the identity - - - type, size, location, and attributes - - - of one element of data for a database entity when an application submits an update to a data item, the Data Management System will accept the update if it corresponds to the definition of a data item. Otherwise, the change is rejected and reported as an exception. The Database Administrator will add, delete or change the data item definitions. There are a number of data items that are used by the Data Management System. These include the type called "alpha-numeric" which include words and characters, names, addresses, dates and titles. Then, there are data items designated as "numeric" which involve integers and decimals with or without signs. Then, there are data items designated as "real" which involve single precision floating point numbers that occupy one word. An example of this would be, for example, an employee's salary. Then, there are data items which are called "Boolean" which involve TRUE and FALSE values.

The "global data item" is a data item, a group item, or a population item that is not part of any data set but still pertains to the database as a whole. Such global data items are stored in one special record called the "global record" in the DASDL declaration which is outside the structured definitions. Sometimes the global record is placed just before the structured definitions in the DASDL file. The global data item has the purpose of holding permanent information about the database as a whole or about a particular data set. It also acts as a place holder for information that can be derived from the database.

One of the most significant options in DASDL (Data And Structure Definition Language) is that it is possible to define the database as to whether the database is to be audited. The data management system supports both logging changes to a database (auditing the database) or not logging changes (maintaining an unaudited database). There are advantages in auditing a database since this assures the user that if a database failure occurs, there will be a record of database changes with which one can restore the database to a completely integral state and thus avoid loss of information and corruption of information.

The "audit trail" is a log of changes made to the database. This type of audit trail is somewhat similar to the SUMLOG in the host system which is history of all system activity except for the fact that the audit trail will record the database update activity only and will consist of separate numbered files. Thus the data management system software can use an audit trail to recover the database from an unusable state, provide restart information to user programs, reconstruct portions of the database that had been lost because of hardware errors, back out aborted transactions and roll back the entire database to a user specified point or rebuild the entire database to a user-specified point.

The "audit file" provides a chronological history of all update database transactions. The audit file is a numbered segment of the database audit trail where the data management system assigns each audit file to have an audit file number (AFN) in the range of 1 to 9999.

Access Routines Program: The data management system controls access to database data with a software program called Access Routines which is a collection of specialized routines that enables many users to access the database all at the same time and ensures that the access is controlled so that accesses do not conflict with one another.

Control File: Each active data management system database has a control file. The control file contains the time stamps for the database software and files and the access routines since the access routines use time stamps to check the validity of data. A control file also contains the update levels of the database and the structures since the access routines use update levels to check the validity of data. Further, the control file functions to store audit control information, dynamic database parameters plus other information. It further guards the database from interruption while a process that needs exclusive access to the database goes on to complete its task successfully, such as, for example, a halt/load recovery and/or a reorganization. The control file assures that a database that has been interrupted for any reason is not accessed until the integrity of the database is further guaranteed by the successful completion of the recovery process.

I/O Operation: An I/O (Input/Output) operation is one in which the system reads data from or writes data to a file on a peripheral device, such as a disk drive. When there is a failure of a read or a write operation, then this is considered to be a I/O error, which must be handled.

Backup: The most important preventive maintenance task which can be performed for a database is to back up the database frequently and to keep the backups for some period of time. To "back up" the database, means to use the data management system DMUTILITY program to make a copy of all or part of the database. This backup will include a check of the physical integrity of all the database's structures being backed up. A complete database includes providing a reserve copy of all the files pertaining to the database. All the files include not only the database files and the control files (which may change from time to time) but also the DASDL source file, the description file, various tailored files, application programs, and audit files. This enables a user to put the database back in operation quickly in case the current database files should become unavailable or damaged.

Here there is involved the concept of "DUMP." A DUMP involves either a copy of stored data in which a change has been made since the previous DUMP of that data or a transfer of all or part of the contents of one section of computer storage to another section or to some other output device. The processes used to make a database are called "backing up" and "Dumping." A backup to tape is called a "Tape DUMP" while a backup to disk is called a "Disk DUMP."

Often the backing up operation for the database is done by increments. An increment is one of the series regular consecutive additions, for example if a database is too large to back up on a daily basis, the operator could create a schedule that backed up a certain number of database files (an increment) each day until the entire database was backed up.

The dump of a database is done to tape or disk depending on what type of storage resources are available. Tapes are most frequently used since they are the less expensive resource than disk. When dumping is done to tape, it is necessary to furnish information common to any disk-to-tape process and this information would include the tape name, the cycle number, the version number, workers, the serial number, compression and non-compression, the density, and the SCRATCHPOOL option.

However, when dumping to disk it is only necessary to specify the file title for the entire dump and the number of DUMP files into which the system should place the DUMP.

Recovering a database means to get it back and ready up to date, ready for access with complete and correct data. The recovery of the database can be done either automatically or be done manually using various software utilities and commands.

The present system and method provides enhancements which accomplish performance improvements in the DMSII database utilities, plus support for new tape devices and other efficient back-up methods. The presently-described system achieves special optimization of Input and Output in both disk or tape operations, plus special DUMP features which enhance the ability to perform database back-up. As a result, total back-up time has been reduced due to the ability to DUMP the data blocks which have been modified since the last DUMP. Thus, the presently described system will provide users with more options for improving the efficiency of their database administration and operational practices.

SUMMARY OF THE INVENTION

A system and method is provided to enhance the ability to perform database back-up using special features designated as the "Incremental DUMP" and also a feature designated as "Accumulated DUMP". As a result, the total back-up time has been considerably reduced due to the ability to dump the data blocks which have been modified since the last DUMP. This enables the data recovery process to operate more efficiently due to the lesser number of audit images that are being applied.

The incremental and accumulated DUMP procedures involve an interface which is directed to the performance of running DUMP to Tape or DUMP to Disk. Often when DLT tape devices are used, it has been noted that a functional DMUTILITY program is not writing enough data to keep the drive streaming so that repositioning of the tape unit is necessary. This repositioning takes time and then slows-down the DUMP processes.

Due to this type of problem, changes have been made to expand the Input buffer used for reading files from disk and further to increase the block size used for writing out to tape. This tape block size can have a maximum of up to 65,535 words.

A previous procedure designated DMUTILITY was limited by a block size for 903 words for a "DUMP To Disk" operation. This has been expanded from 903 words to 20,040 words in order to improve the performance by then reducing the number of Input/Output operations (I/Os) for disk drives. Further, the user can also specify the block size by utilizing a new Block Size clause in the DUMP Command which may be expanded up to 65,520 words.

Similar enhancement is also made for DUMP to Tape where the User can specify the block size by utilizing a new block size clause in the DUMP command which may be expanded up to 65,535 words. The tape density is a required parameter for the DUMP command, and the maximum block size allowed is based on the density value this limitation is imposed by the tape device.

GLOSSARY OF SIGNIFICANT TERMS

ACTION COMMAND: A control signal that moves the user from one screen to another or manipulates data on the screen.

ACTION FIELD: A field that appears on a screen and begins with the prompt "Action:". The user enters the desired action for execution between the indicators to the right of this prompt.

ACTION LINE: The location on a screen where the Action field appears.

ADDRESS: (1) The identification of a location in storage (memory). (2) A sequence of bits, a character, or a group of characters that identifies a network station or a group of stations, a user, or an application. (3) The location of a device in the system configuration.

ALTERNATE RECORD KEY: A key, other than a prime record key, whose contents identify a record of an indexed file.

ARRAY: An ordered collection of a fixed number of common variables under one name.

AUDIT: In reference to computing, an examination of equipment, programs, activities, and procedures to determine how efficiently the overall system is performing, especially in terms of ensuring the integrity and security of data.

AUDITING: The process and operating system uses to detect and record security-related events, such as an attempt to create, to access, or to delete objects such as files and directories. The records of such events are stored in a file known as a "security log," whose contents are available only to those with proper clearance.

AUDIT TRAIL: In reference to computing, this is a means of tracing all activities affecting a piece of information, such as a data record, from the time it is entered into a system to the time it is removed from the system. An audit trail makes it possible to document, for example, who made changes to a particular record and when they did it.

AUTHENTICATION: In a multi-user or network operating system, the process by which the system validates a user's logon information. A user's name and password are compared against an authorized list, and if the system detects a match, then access is granted to the extent specified in the permission list for that user.

AUTHORIZATION: In reference to computing, especially remote computers on a network, the right granted to an individual to use the system and the data stored in it. Authorization is technically set up by a system administrator and verified by the computer based on some form of user identification, such as a code number or password. Sometimes this is called "access privileges."

BLOCKING FACTOR: The number of logical records stored in a physical record on disk or tape.

BLOCKSIZE: A file attribute that gives the length of a file block.

BOOLEAN: Pertaining to variables having a value of TRUE or FALSE.

BUFFER: An area in which data is stored temporarily.

CANDE: See Command and Edit.

CHECKPOINT: A place in a program where the program is to be stopped so that its current state can be written to disk. After the state of the program has been recorded, program execution resumes where it left off. If the system halts unexpectedly before the program finishes, the program can be restarted at its most recent checkpoint instead of at the beginning.

COBOL74: A version of the COBOL language that is compatible with the ANSI X3.23-1974 standard.

COMMAND EDIT (CANDE): A time-sharing Message Control System (MCS) that allows a user to create and edit files, and develop, test and execute programs, interactively.

COMPARE OPERATION: The set of steps that is performed by DMUTILITY after each backup session to validate that the data saved on disk or tape is free from block checksum, block sequencing, and I/O errors. It is done automatically, and a new option has been added to disable this operation.

COMPARE PHASE: After each database backup session, the DMUTILITY program automatically issues the compare operations to verify that the data written to tape or disk is free from block checksum, block sequencing, and I/O errors. This phase is referred to as the compare phase of the backup operation.

COMPILE-TIME OPTIONS: A set of options consisting of the two classes of options that can be set at compile time: i.e., compiler control options and compile-time default values and limit changes.

CTS9840 TAPE DRIVE: A SCSI (Small Computer Systems Interface—An ANSI standard) tape subsystem introduced by Storage Tek using a unique form of half-inch cartridge media and supporting 128 track density. A track is a longitudinal area on the tape along which a series of magnetic signals may be recorded. Software changes have been made to support this new tape device for DMUTILITY.

DASDL: Data And Structure Definition Language for defining the database.

DATA MANAGEMENT SYSTEM II (DMSII): A specialized system software package used to describe a database and maintain the relationships among the data elements in the database. Described in Unisys Publication Part No. 8807 6625-000, September 1997, entitled *"Unisys: Getting Started With DMSII"*.

DBA: The definition, design, maintenance, and use of a database (DMSII or other databases) and its related products which should be coordinated and controlled by a single administration. This control is typically established in the function of a Data Base Administration, abbreviated as DBA.

DISJOINT DATA SET: A data set is conceptually similar to a conventional file. It contains the actual records of information. A disjoint data set is a file that is not contained within another file. It is free standing.

DLT: This involves a tape storage technology developed by Digital Equipment Corporation to offer high speed storage for digital asset protection. This technology was later bought out by Quantum Corporation in 1994. This technology or DLT was three-to-four times faster and offered several multiples of capacity than previous tape storage units. It also practically eliminated most of the reliability problems that the earlier drives exhibited when used in heavy duty cycles. DLT uses a linear recording technology that simplifies the tape path and minimizes head-to-tape contact. This provides a drive that can read and write data all day long day after day apparently without data lost or failure.

DLT Tape: DLT is an abbreviation for Digital Linear Tape. It is a high performance, high capacity, streaming cartridge tape produce designed for use on midrange and high-end computing systems.

DMDUMPDIR: A program that retrieves and modifies directory information for database dumps. When this program is enabled, directory entries are created automatically when a new database dump is created, or existing database dump is copied, or existing database dump is duplicated.

DMSII: See Data Management System II.

DMUTILITY: This is a program which will parse the new syntax to scan for the Exclude keyword and to build a dump list to reflect that specific disjoint data set and all of its sublevel structures which are to be excluded from the dump.

DUMP OUTPUT LISTING: Following the execution of each dump command, an output listing will be sent to a session printer backup file so the user can have hard copies of the dump directory and files that were included in the dump operation.

DUMP TO DISK: Software for speeding up the dump to disk operation where software changes are made to optimize existing disk read and write operations. Performance gain is accomplished through expansion of buffer sizes which reduces the number of I/Os required.

DUMP TO TAPE SESSION: A database backup is a snapshot of an entire database or of parts of a database. The backup can later be used to recover lost data, or transfer the database from one location to another. One of the features in a DMUTILITY DUMP command is to create a backup copy of the database on tape. When this command has been executed, a Dump to Tape session will be initiated.

DUMP VERIFICATION: Same as the definition for "Compare Operation."

EXCLUDE KEYWORD: New syntax to be added to DMUTILITY program to allow users to exclude certain database files in a dump command. This is useful when the excluded files have been backed up previously and no new changes have been made that require new backup to tape or disk.

EXCLUDE PARAMETER: This is for the DMUTILITY Dump command which has the purpose of excluding one or more structures from the database dump. This new feature provides flexibility to the current Dump command and is especially helpful when a small percent of the structures are being excluded from the Dump operation. This command is supported for the DMUTILITY Dumps with all the files selected, and it allows user to select one or more disjoint data sets and all of the structures associated with it (sets, subsets, embedded structures, etc.) which are to be excluded from each dump session.

FILE NAME: (1) A unique identifier for a file, consisting of 1 to 14 name constants separated by slashes. Each name constant consists of 1 to 17 letters, digits, hyphens, and/or underscores. A file name can be optionally preceded by an asterisk (*) or usercode, and optionally followed by ON and a family name. (2) In RPG, a name that designates a set of data items. (3) In COBOL, a user-defined word that names a file described in a file description entry or a sort-merge file description entry within the FILE SECTION of the DATA DIVISION.

GARBAGE COLLECTION: In Data Management System II (DMSII), the process of consolidating deleted or unused space in data sets, sets, and subsets, and returning this space to the system.

HALT/LOAD: A system-initialization procedure that temporarily halts the system and loads the Master Control Program (MCP) from disk or pack to main memory.

HELP TEXT: Information displayed online when a user presses the specify (SPCFY) key or enters the HELP or TEACH command along with a keyword.

INDEXED ORGANIZATION: The permanent, logical file structure in which each record is identified by the value of one or more keys within that record.

INDEXED SEQUENTIAL ACCESS METHOD (ISAM): A method that provides efficient, flexible random access to records identified by keys stored in an index.

ISAM: See Indexed Sequential Access Method.

KEY: (1) A field used to locate or identify a record in an indexed file. (2) In COBOL, a data item that identifies the location of a record, or a group of data items that identifies the ordering of data. (3) In Data Management System II (DMSII), a field that serves as a retrieval key for a set or subset.

KEY OF REFERENCE: In COBOL, the prime or alternate key currently being used to access records within an indexed file.

KIND: The file attribute that indicates the type of device on which the file is stored.

LABEL: (1) The first 28 sectors on a disk, on which information about the disk is stored. This information includes the family name and serial number, the Master Available Table (MAT), the family index number, information about the family's base pack, and a pointer to the system directory if the disk contains a directory. (2) In RPG and ALGOL, a name that identifies either a point in the Calculation Specifications where a GOTO operation branches or the beginning of a subroutine.

LIBRARY: (1) A collection of one or more named routines or entry points that are stored in a file and can be called by other programs. (2) A program that exports objects for use by user programs.

LIBRARY DIRECTORY: A memory structure associated with a library process stack that describes the objects exported by the library process.

LIBRARY PROCESS: An instance of the execution of a library. The sharing option of a library determines whether multiple user programs use the same instance of the library.

MAJOR KEY: The first key in a complex key.

MINOR KEY: Any key in a complex key that is not the major (first) key.

MIX: The set of processes that currently exist on a particular computer. The mix can include active, scheduled, and suspended processes.

MIX NUMBER: A 4-digit number that identifies a process while it is executing. This number is stored in the MIX-NUMBER task attribute.

NO COMPARE OPTION: This involves another option whereby normally the DMUTILITY currently performs a compare operation automatically after each dump operation. Here, there is provided a new option called No Compare which will be available to the user so that the compare phase will be an optional choice. This feature is useful to users for the possibility of running verification of the dump with the VERIFYDUMP command at a later time.

ODT: See Operator Display Terminal

OPERATOR DISPLAY TERMINAL (ODT): (1) A system Control terminal (SCT) configured for direct communication with the operating system. The ODT is used primarily by operations personnel for entering commands that control and direct the system and its resources. (2) The name given to the System Control Terminal (SCT) when it is used as an ODT.

PARAMETER: (1) A quantity or item of information that can be given a different value each time a process is repeated. (2) An identifier associated in a special way with a procedure. A parameter is declared in the procedure heading and is automatically assigned a value when the procedure is invoked. (3) An object or value that is passed from an actual parameter and received by a formal parameter.

PRIME RECORD KEY: A key with contents that identify a record in an indexed file.

PROCEDURE: (1) A block that can be invoked by statements elsewhere in the same program or, in some cases, by statements in another program. In most cases, a procedure has a procedure heading and a procedure body. Examples are a procedure in ALGOL, a procedure or function in Pascal, a subroutine or function in FORTRAN, or a complete COBOL program. (2) In COBOL, a paragraph or group of logically successive paragraphs, or a section or group of logically successive sections, within the PROCEDURE DIVISION.

RECORD KEY: A key, either the prime record key or an alternate record key, with contents that identify a record within an indexed file.

RESULT DESCRIPTOR: A 48-bit word that is the standard Data Management System II (DMSII) exception word. A result descriptor includes the exception category and subcategory, and the structure number involved. When an exception occurs, the last bit in the 48-bit word is set to 1. When an operation is successful, the 48-bit word contains all zeros.

RPG: Report Program Generator. A high-level, commercially oriented programming language used most frequently to produce reports based on information derived from data files.

SERIAL NUMBER: This involves the display serial number whereby the program DMUTILITY will display the serial number of the tape, which contains the latest directory information in the dump output listing. This information is helpful for Database Administrators for subsequent DMUTILITY runs. In old systems, the Serial Number information was displayed when DMDUMPDIR is enabled. However, this can be improved in order to have this available in the DMUTILITY program without the need to use DMDUMPDIR.

SERIAL NUMBER INTERFACE: This is for the purpose of displaying the tape serial number of the latest version tape in the dump output after each Dump to Tape session has completed. The tape serial number information is currently available by enabling the option DMDUMPDIR. In most cases, a database fits in multiple volumes and there will be only one serial number that the DBA needs to know, for obtaining the latest version of tape, and this information will be available through DMUTILITY.

SUPPORT LIBRARY: A library that is associated with a function name. User programs can access a support library by way of its function name instead of its code file title. The operator uses the SL (Support Library) Operator Display Terminal (ODT) command to link function names with libraries.

SYMBOLIC FILE: A file that contains a source program.

VERIFYDUMP—a command which will check the dump file against errors such as block checksum, error block sequencing error, and I/O errors. If a problem has been detected, an error message will be displayed.

DESCRIPTION OF PREFERRED EMBODIMENT

Figure 1:
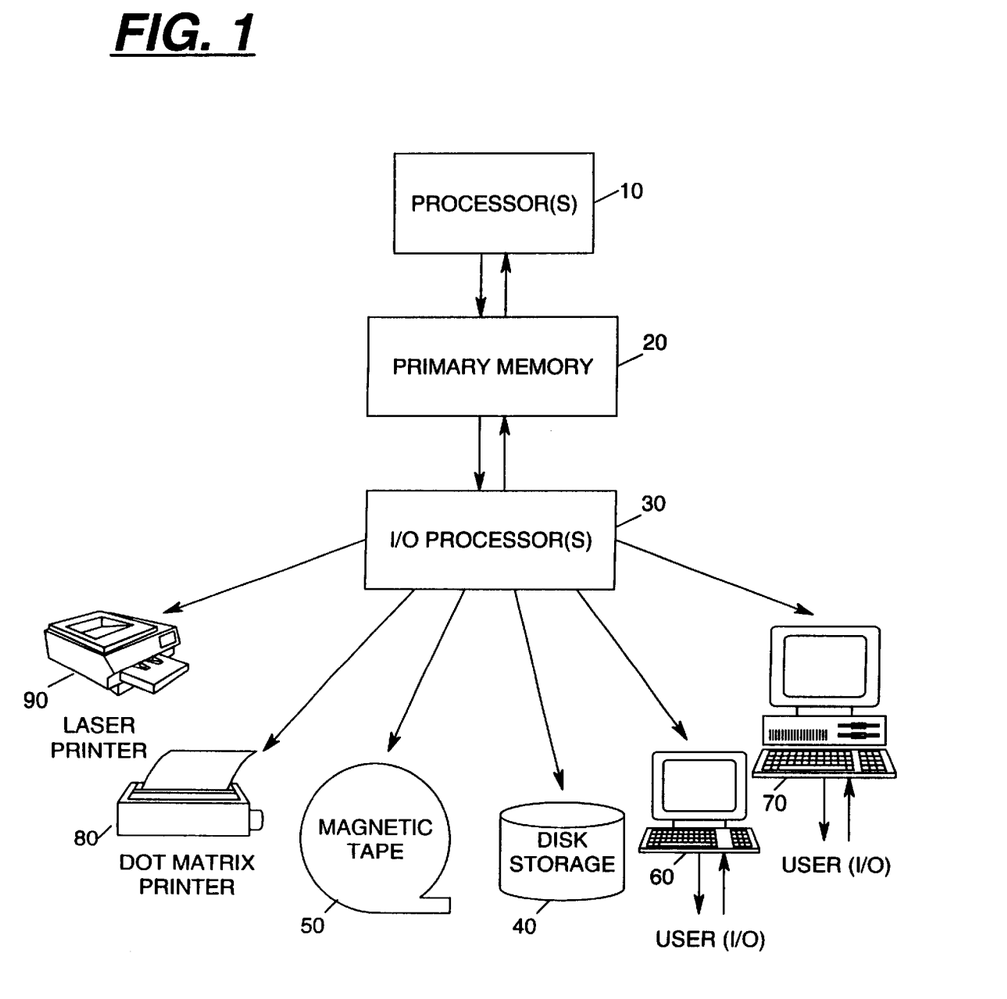
FIG. 1 is a drawing of the environmental modules in which the present invention is implemented.

Referring to FIG. 1 there is shown a typical operating environment which makes use of the Unisys Data Management System II, and which has been enhanced to improve the back-up ability for dumps to disk storage and to magnetic tape.

A processor 10 operating under a Master Control Program is connected to a primary Main Memory 20 which then communicates with a series of I/O processors 30. The I/O processors 30 are set-up and connected for communication with peripheral devices, such as the disk storage 40 and the magnetic tape 50.

Additionally, the I/O processors 30 are operative in communication with a User I/O terminal 60 and the User I/O Operator Display Terminal 70. Various commands and functions can be initiated through the User terminal 60 and the Operator Display Terminal 70.

Also connected to the I/O processors 30, is a dot matrix printer 80 or a laser printer 90 which can be used for printing out desirable information from the system.

The present system involves a more rapid and efficient method of functionality for the back-up of a database. As a very important preventive maintenance task, it is essential that the database be backed-up frequently and kept for an extended period of time. Backing-up the database means, in this situation, to use the DMSII DMUTILITY program in order to make a copy of all or part of the database. The back-up operation will include a check of the physical integrity of all of the database structures being backed-up.

It is generally recommended that a back-up be done every day and possibly even more often if there are special circumstances involved. One typical operation is that of making changes to the database structures as a special operation and during which such operation backups should be utilized both before the changes and after changes. A complete database back-up includes a reserved copy of all of the files pertaining to the particular database. All these files include not only the database files and the control file, but also the DASDL source file, the description file, the tailored files, the application programs, and the audit files. Thus, by having a reserved copy of all the files necessary for the database, this enables the Users to put the database back into operation quickly should any situation occur where the current database files become damaged or unavailable or lost in some fashion.

An essential part of the back-up procedure for database files is the use of a Dump. The Dump refers to either a copy of stored data in which a change has been made since the previous Dump of that data, or the transfer of all or parts of one section of the computer storage to another section, or to some other output device.

Using the DMUTILITY program in a database back-up, the processes which are used to make a database back-up are called backing-up and/or Dumping. The backed-up database is called a back-up or a Dump, while a back-up to a tape peripheral is called a Tape Dump and a back-up to a disk peripheral is called a Disk Dump.

For further security, it is often recommended to make a back-up of the back-up file. The reasons for this is that files can be deleted or made unusable so that it is possible to use certain of the following commands to back-up the database dump. These are:

(i) a COPYDUMP command which produces a copy of the back-up by further copying the back-up to the same type of media or to a different type of media;

(ii) The DUPLICATEDDUMP command produces a duplicate of the back-up (such as REEL-FOR-REEL and TAPE-FOR-TAPE) by duplicating the particular back-up onto the same type of media.

The Dump command is used as part of the database back-up. The files that the Dump command backs-up are either some or all of the database files and the control file. There are several types of management utilization in backing-up these files so that the User may want to back-up the files only when they change, or else to use utilities other than the DUMP command to copy the files.

In order to back-up the database files other than using the DUMPS and to have all database files backed-up in case the User needs to re-establish the current database from scratch, there are certain files that are required to be held in reserve and these are:

(a) The DASDL source file;
(b) The Audit files. Copies of both the primary and secondary audit trails;
(c) Tailored Software: DM SUPPORT LIBRARY, RECONSTRUCT program, and sometimes certain sites will require the TransIT OPEN/OLTP product, the RM SUPPORT LIBRARY; and
(d) The Database Description file.

Thus, the User would back-up a database application program after a database reorganization, for example, that closes the application program to further changes.

Additionally, the User would back-up an application program when one backs-up the pack on which it resides.

Two dump commands, Incremental and Accumulated, are introduced to allow the Users the option to dump only those portions of the database which have changed since the last dump. These dumps are generated based on the last update time of each data block for each structure in the database. These features can potentially reduce the total time required to perform database dumps. For incremental dump, all data blocks which have changed since the last full, incremental or accumulated dump, are backed-up. For accumulated dump, all data blocks, which have changed since the last full dump, are included in the dump.

Incremental and Accumulated back-ups copy only the files that were added to changed since the last lower level dump were backed-up. Since most of the files, e.g., system files, are static they will not be included in the dump. This can save considerable space and time. A complete restoration of a damaged file system will then require the last full dump followed by the incremental and accumulated dump (s). Incremental and Accumulated dumps can be done weekly or daily, depending on file system activity and importance.

Figure 2:
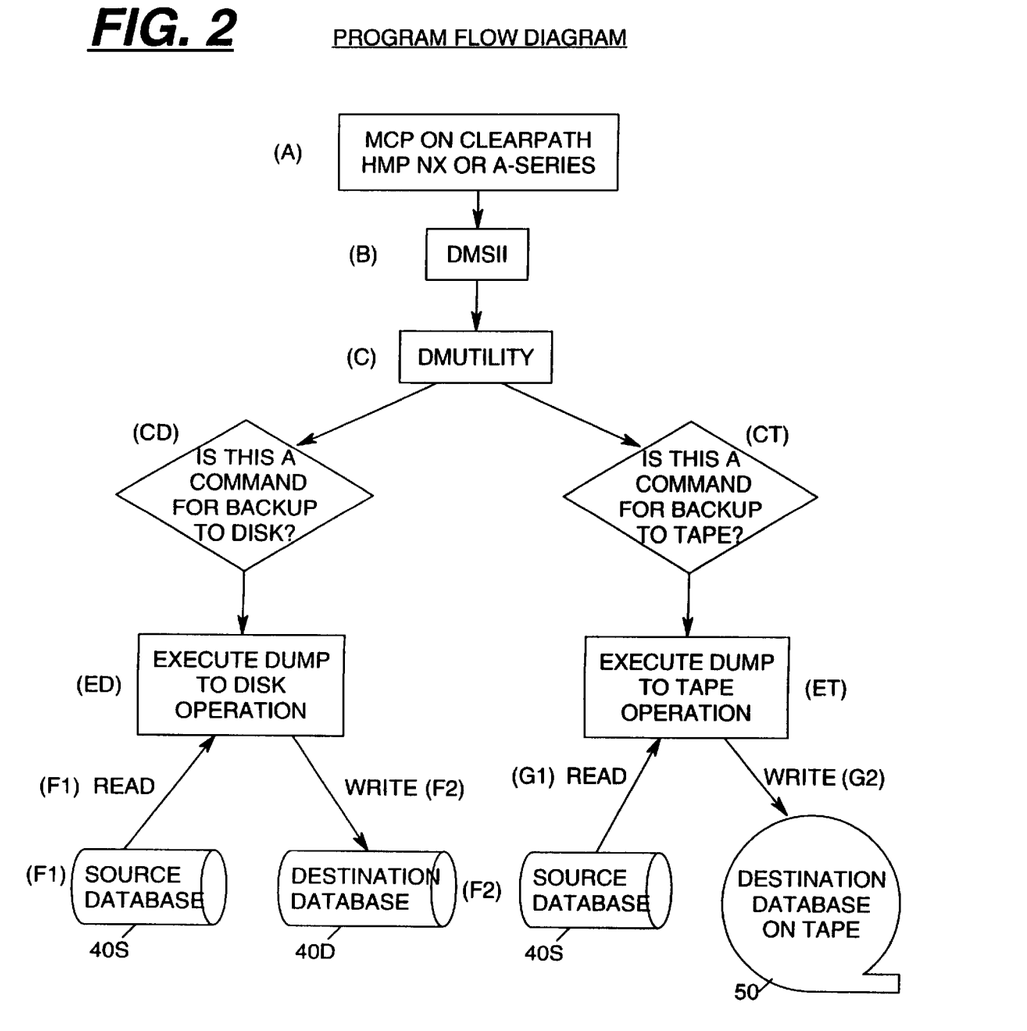
FIG. 2 is a flow chart of the program flow diagram for selecting involvement for back-up to a disk or to a tape unit.

FIG. 2 is an illustration of a program flow diagram to indicate the overall sequences involved in the newly-developed back-up system for a computer operating system.

Step marker (A) indicates the Master Control Program in the processor 10 which is used for example, in a Unisys ClearPath heterogeneous multi-processor system designated NX (or A-Series) computers.

At step (B), the Operating System of the MCP is connected to the Data Management System II. The Data Management System (DMSII), as previously noted, is a specialized system software package used to describe a database and to maintain the relationships among the data elements in the database. Then, the sequence proceeds to step (C) which invokes the DMUTILITY program which will parse the newly-provided syntax in order to scan for a keyword designated as the "EXCLUDE" keyword, thus, to build a DUMPLIST TO reflect the specific disjoint data set and all of its sub-level structures which are to be excluded from the DUMP.

At this stage, a branching occurs into two separate decision blocks. At decision block (CD) the query is posed as to whether this back-up command is for back-up to a disk unit. On the other branch, a decision block (CT) is indicated to query whether this is a command for a back-up operation to Tape.

Now following through on step (CD) for the back-up to disk operation, the next step is step (ED) which is the execution of the DUMP-TO-DISK operation. This involves software for speeding up the DUMP-TO-DISK operation, where software changes are made to optimize the existing disk Read and Write operations which are shown at steps (F1) and (F2). As will be discussed hereinafter, performance gains are further accomplished through expansion of buffer sizes in order to reduce the number of I/O's involved.

Now returning to step (C) and on to the branch (CT) which involves a back-up operation to tape. From step (CT), the next sequence is step (ET), which is an execution of a Dump-to-Tape operation. Since the database back-up is actually a snapshot of the entire database or merely parts of the database, it is essential to have a back-up which can later be used to recover lost data or even to transfer the database from one location to another. Thus at step (ET), a Dump-to-Tape session is initiated, where at step (G1) there can be a Read operation from a source database 40s and also a Write operation at step (G2) which provides the destination database to placed on tape 50.

Figure 3A:
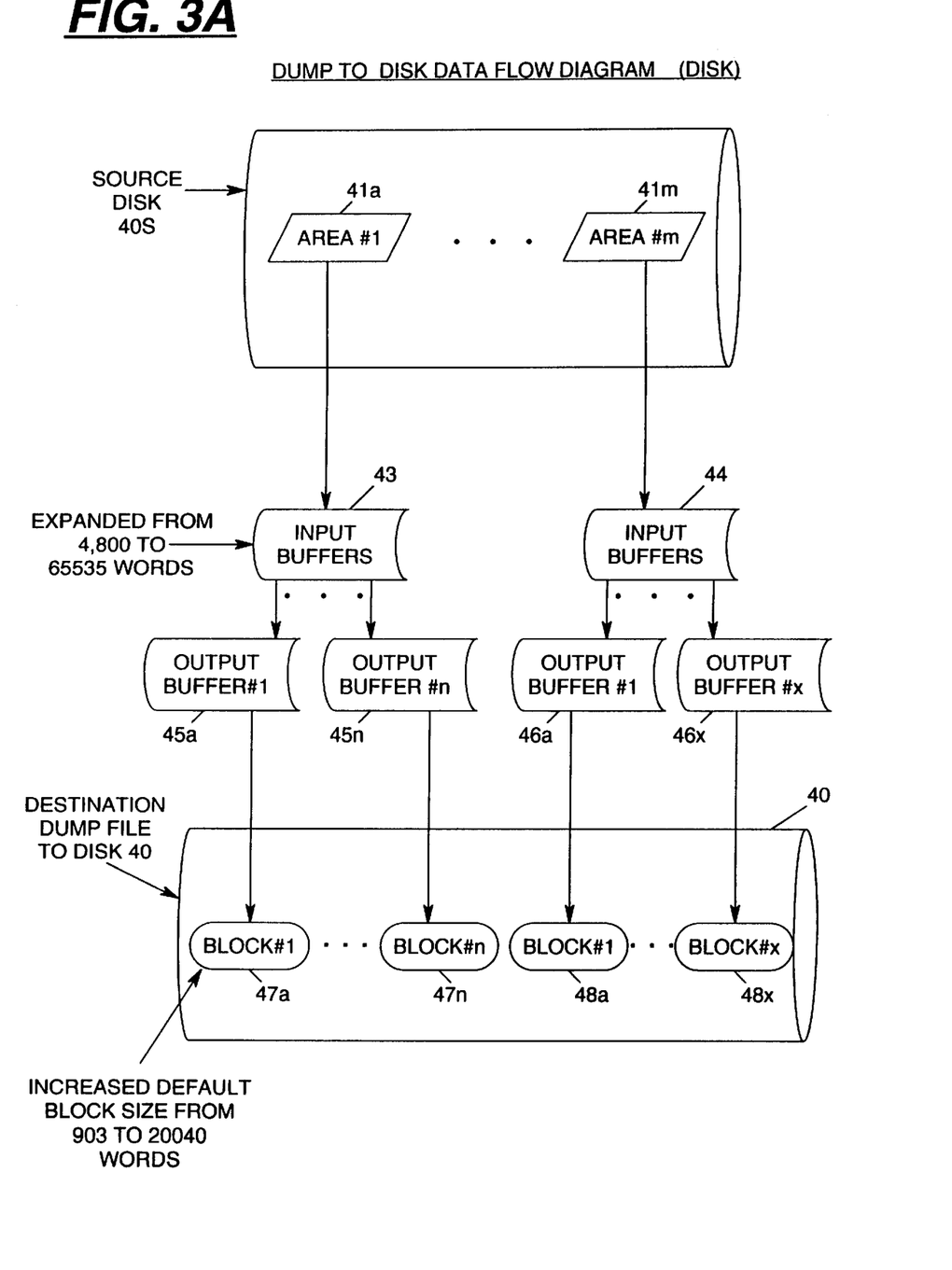
FIG. 3A is a flow chart illustrating the enhanced data DUMP to disk.

FIG. 3A is a drawing indicating features of the Dump-to-Disk data flow. For example, the source disk 40S is seen to have a multitude of separate areas designated 41a through 41m. Each of these areas are transferred to separate Input buffers designated as 43 and 44 which have been expanded from their normal 4,800 words to 65,535 words. Subsequently, the data in the Input buffers 43 and 44 are then respectively transferred to the Output buffers 45a . . . 45n and 46a . . . 46x thence to the destination Dump file 40. The Output buffer 45 is then placed in a block designated 47, while the Output buffer 46 is then placed in a block 48 within the destination Dump file 40. It is also noted that there is now provided an increased default block size from the normal 903 words up to 20,040 words. A more efficient data transfer operation is now enabled since larger block sizes of words can be transferred per any given single command operation.

As a result, the Disk 40 will now hold a series of data blocks where blocks 47a . . . 47n derive from Output Buffers 45a–45n. Then data blocks 48a . . . 48x will derive from Output Buffers 46a . . . 46x.

Figure 3B:
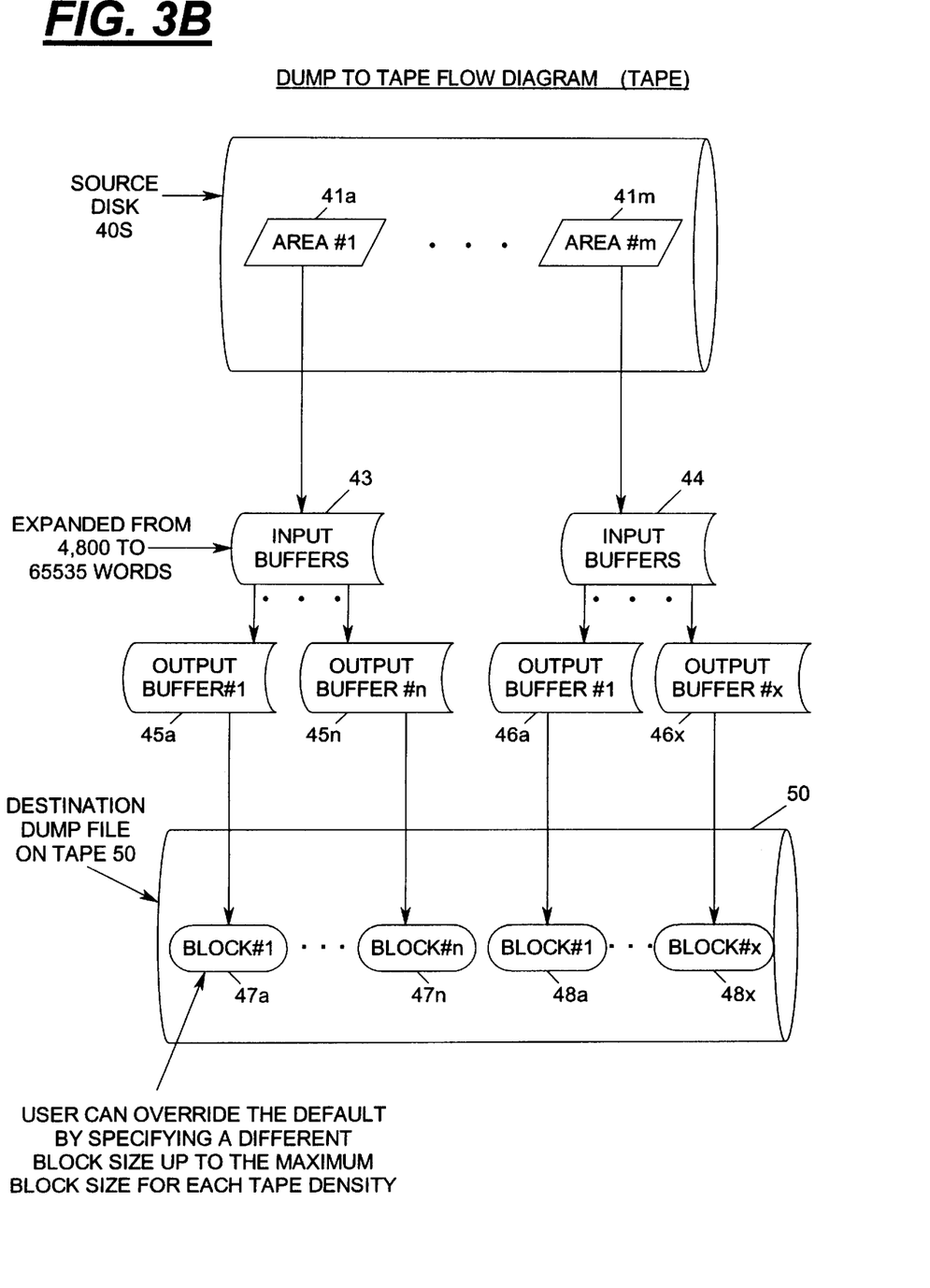
FIG. 3B illustrates the DUMP to tape.

FIG. 3B is an illustration of the Dump-to-Tape flow diagram. Here, as source disk 40S will be seen to have a series of data areas designated 41a . . . 41m. The data in these areas from source Disk 40S will then be conveyed to the Input buffers 43 and 44. These buffers have been expanded from their normal size of 4,800 words, up to 65,535 words.

The Input buffers 43 will then be transferred to a series of output buffers 45a . . . 45n. Likewise, the Input buffers 44 will be transferred to the Output buffers 46a . . . 46x.

Subsequently, the information will be placed on the destination DUMP file on Tape 50. On Tape 50 there will be a series of blocks designated 47a . . . 47n which derive from the buffers 45a . . . 45n. Likewise, the DUMP file on Tape 50 will also have a number of blocks designated 48a . . . 48x which have been derived from the Output buffers 46a . . . 46x.

Figure 4:
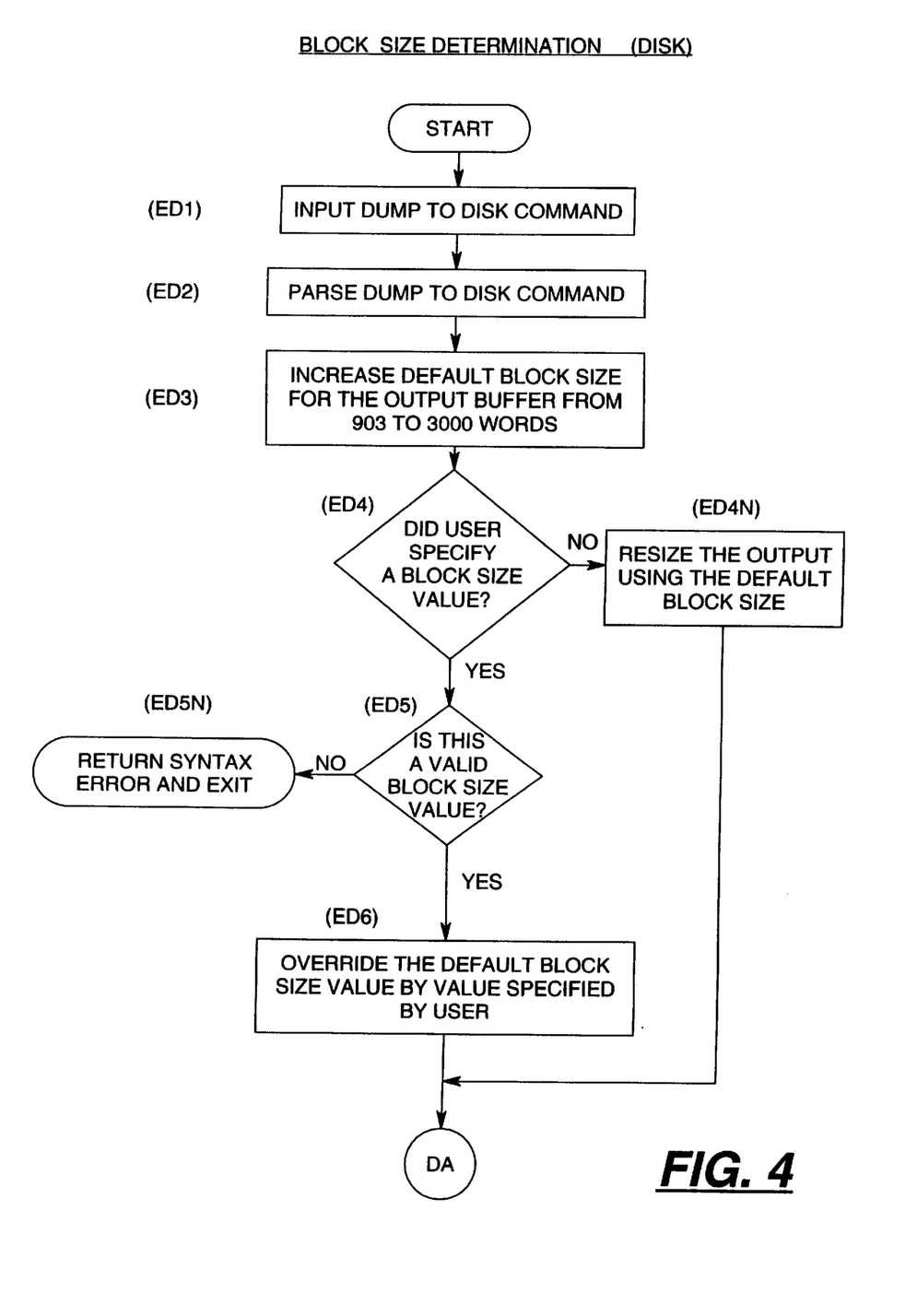
FIG. 4 is a flow chart illustrating how a user can specify a functional block size to be used for the Input DUMP to disk command.

FIG. 4 is a chart indicating the sequence of steps for determination of the block size (for Dump-to-Disk) which is a variable factor that can be determined by the User of the system.

Thus, when the User desires to establish the size of a block to be utilized, the first sequence involved is step (ED1) which involves an Input Dump-to-Disk command. This initiates a software program to speed up the Dump-to-Disk operation, and to optimize disk Read and Write operations.

At step (ED2), the Dump-to-Disk command is parsed into the required specific commands involved for the system.

At step (ED3), the software will increase the default block size for the Output buffers 45a–45n, 46a–46x (FIGS. 3A, 3B)) from the normal 903 words up to a limit of 20,040 words.

At step (ED4), a decision block poses the query as to whether the User did specify a block size value. If the answer is (NO), then step (ED4N) will re-size the Output using the default block size, which then continues on to the continuation marker (DA).

At step (ED4), if the User did specify a block size value (YES), then the sequence proceeds to step (ED5) which queries "is this a valid block size value?" the answer is (NO), then at step (ED5N) there will be a return of the syntax error and exit from the program.

At step (ED5), if this turns out to be a valid block size value (YES), then at step (ED6) the system will override the default block size value and replace it with a value specified by the User.

Figure 5:
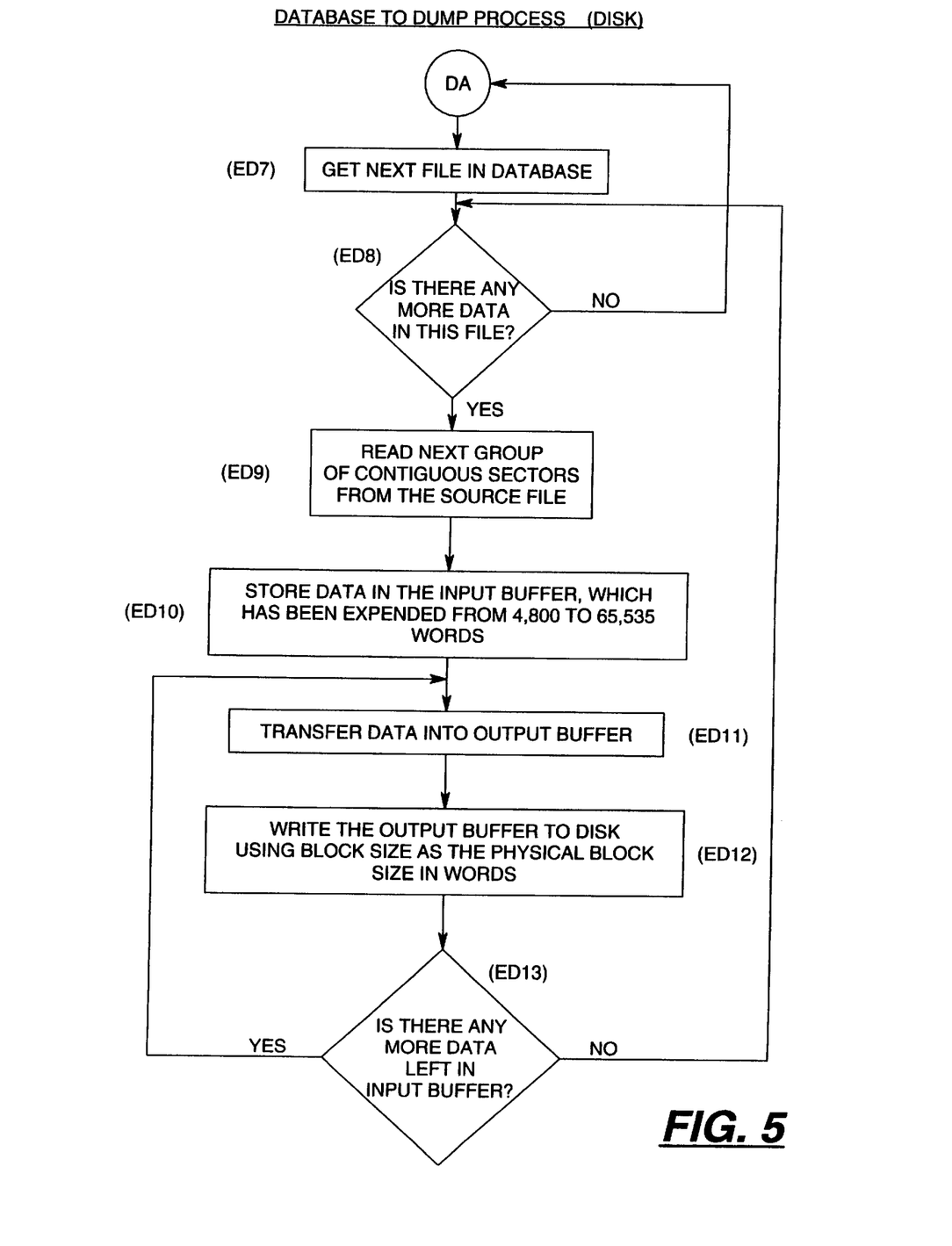
FIG. 5 is a flow chart for providing back-up from a database via a DUMP process using the selected block size as a physical block size in words.

The reference marker DA is shown to indicate that the sequence proceeds to FIG. 5. In FIG. 5 from the reference mark DA, the sequence proceeds to step (ED7) which involves getting the next file in the database, after which the next step (ED8) involves a decision block to query if there is any more data in this file. If the answer is (YES), then the sequence proceeds to step (ED9) which involves reading the next group of contiguous sectors from the source file, such as 40S in FIG. 2.

The next step is step (ED10) where data is now stored in the Input buffers (43, 44 of FIGS. 3A, 3B) which have been expanded from 4,800 to 65,535 words.

Then at step (ED11), the data is transferred into the Output buffers, such as buffers 45a–45n, 46a–46x of FIGS. 3A, 3B, after which at step (ED12) the Output buffer is written to disk using the User-determined block size as the physical block size in words. Subsequently at step (ED13), a decision block queries as to whether there is any more data left in the Input buffer. If the answer is (NO), then the sequence proceeds back to step (ED8). If the answer is (YES), then the sequence proceeds back to step (ED11).

Figure 6:
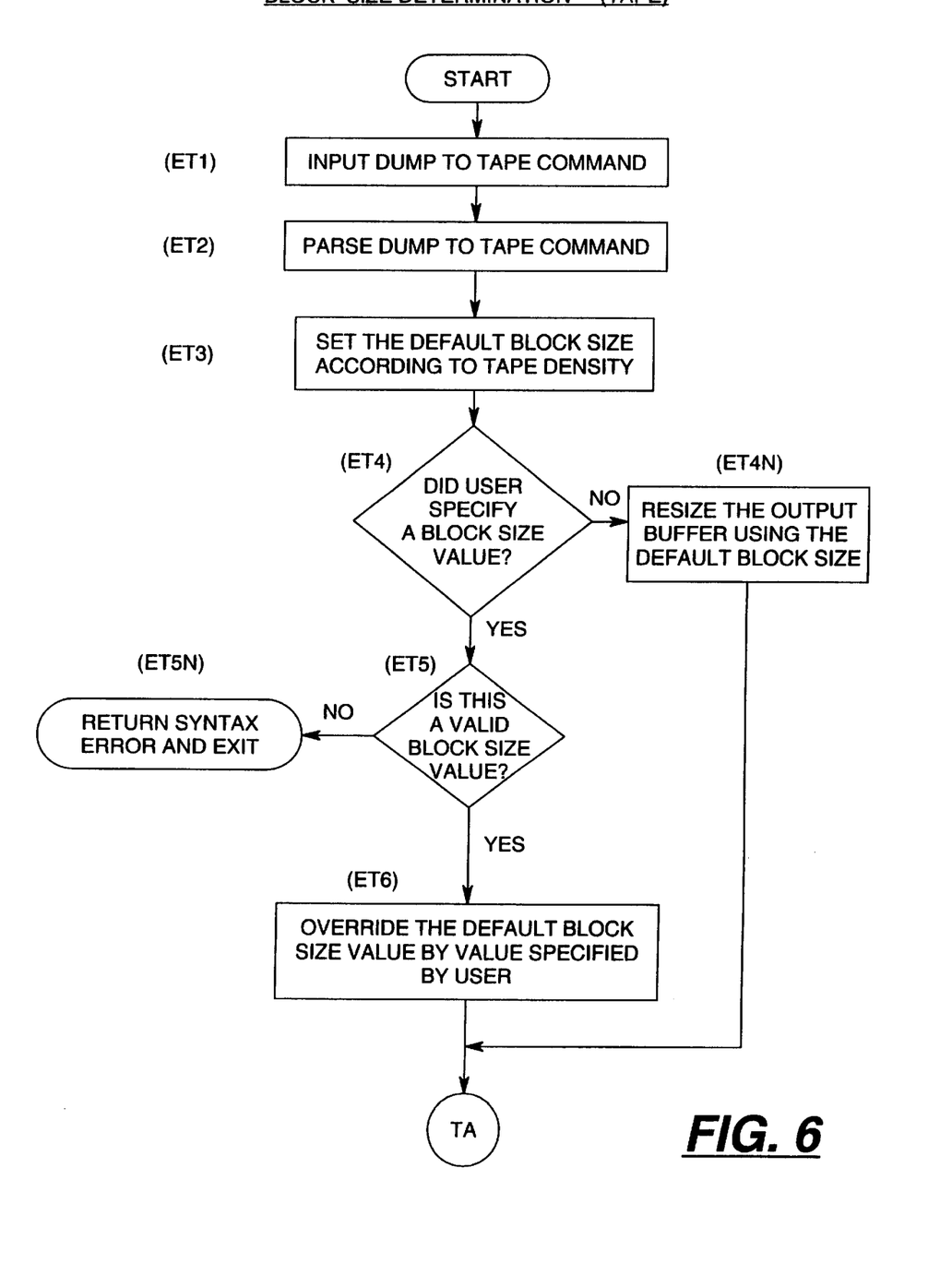
FIG. 6 is a flow chart illustrating a sequence of steps in the Input DUMP to tape command in order to specify a selected block size value.

FIG. 6 is a flow chart showing the sequence of steps required to make a block size determination or a Dump-to-Tape. Referring to FIG. 6 at step (ET1), there occurs the Input Dump-to-Tape command. This is followed by step (ET2) where a parsing of the DUMPED data command is effectuated. Then at step (ET3), the sequence will set the default block size according to the tape density of the particular tape type being utilized.

At step (ET4) a decision block queries as to whether the User specified a block size value. If the answer is (NO), then at step (ET4N) there will be a resizing of the Output buffer for using the default block size, after which the sequence proceeds to reference mark TA. Returning to step (ET4), if the answer is (YES) to the User having specified a block size value, then the sequence proceeds to a decision block at step (ET5). Here, a query occurs as to whether this is a valid block size value. If the answer is (YES), then at step (ET6) the system will override the default block size value by the new value specified by the User.

Figure 7:
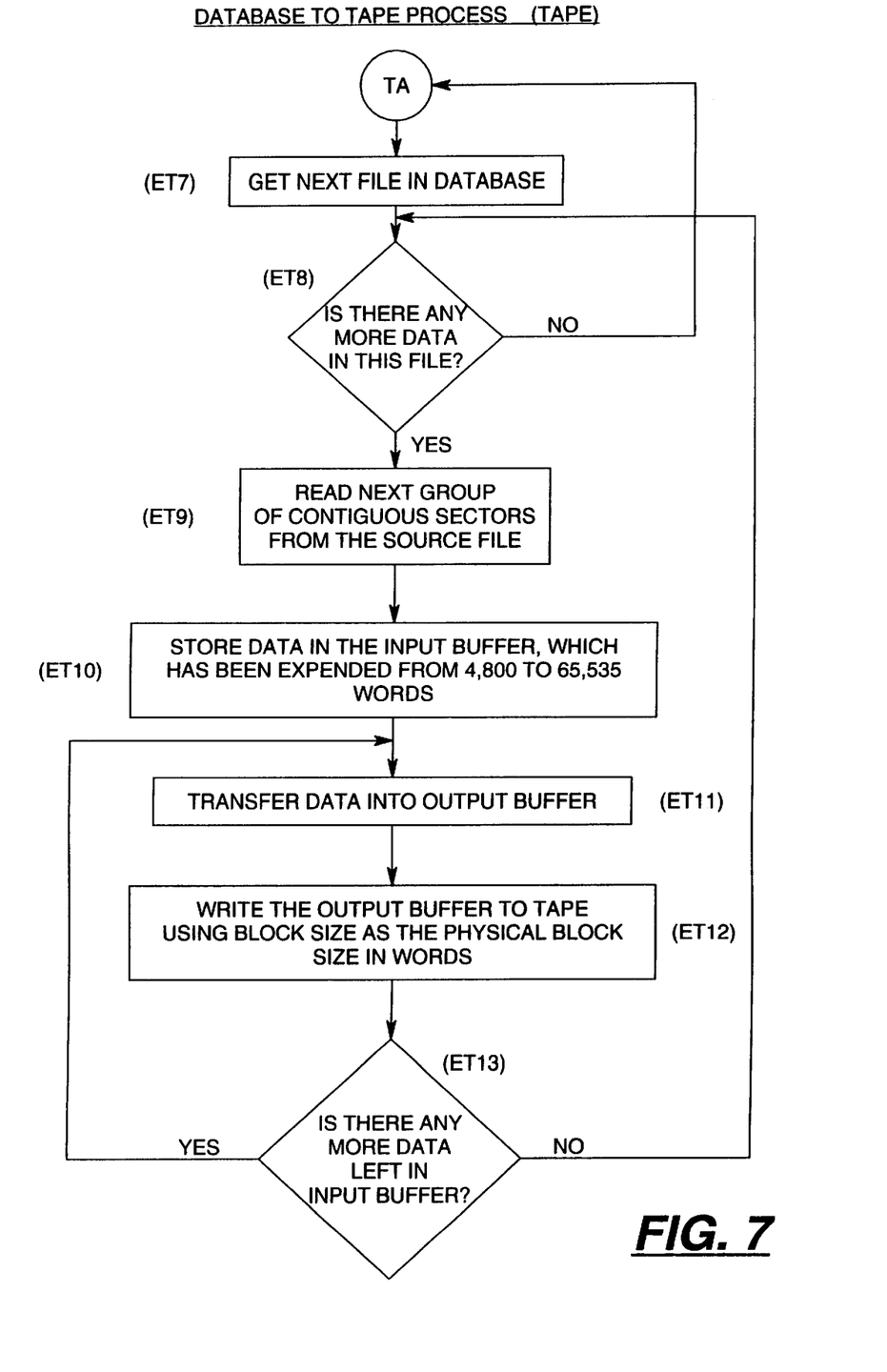
FIG. 7 is a flow chart involving the providing of a back-up from the database for dumping to a tape using the selected block size for this operation.

FIG. 7 is a continuation of FIG. 6, starting with the reference mark TA.

At step (ET7), the sequence will get the next file in the database and then proceed to step (ET8) which involves a decision block to query whether there is any more data in this particular file. If the answer is (YES), the sequence proceeds to step (ET9) where there will be reading of the next group of contiguous sectors taken from the source file which might be, as shown in FIG. 2, at the source data base 40S.

At step (ET10), the data is stored in the Input buffer which has been expanded from its normal 4,800 word size, to 65,535 words for the buffers which are shown in FIGS. 3A and 3B as Input buffers 43, 44.

At the next step (ET11), there will be the transfer of data into the Output buffers 45a . . . 45n, 46a . . . 46x. The next step at (ET12), there is a writing of the Output buffer to the tape using the chosen block size as a physical block size in words. After this at step (ET13), there is a decision block querying whether there is any more data left in the Input buffer. If the answer is (YES), the sequence returns to step (ET11) to finish off any remaining data in the Input buffer. If the answer is (NO), the system then returns to step (ET8) to see if there is any more data in the particularly selected file which must be handled.

There are a number of operational situations and problems which involve the efficiency of data transfer operations in these type of systems. Some of the new enhanced tape drives have high capacity and high speed. If the software which interfaces with the tape drive, for example, performs I/O operations which involves long pauses between the Write operations to tape, then there is always the possibility that the tape device may lose its current position. Then, on subsequent Write commands issued by the software, the tape device will then have to reposition itself so that it has to point to the end of the last Write operation. The liability of this situation is the time lag or latency involved in having to re-position the tape driver device.

It may be noted that the DMUTILITY does not actually issue the positioning commands to the tape drive, but if the write operations are not done quickly enough or if not enough data is written out to the tape, there is always the possibility that the tape device (at the hardware level) will lose its position. When the software program issues the next Write, then the tape drive will need to reposition itself to the place on the tape adjacent to the last Write operation. Since DMUTILITY does not have control over the repositioning operation performed by the tape device, there is still the necessity to ensure that the latency or repositioning lag does not hold-up the data transfers because this will impact the performance of the database back-up and recovery.

Thus, by expanding and using larger buffers during the internal Write operations to tape, this enables an avoidance of any problem which might involve not writing enough data to the tape device. Additionally, this expands the current limit to the maximum allowed by the tape device so that the maximum usage of the tape device is utilized. As a result, there is considerable more efficiency and speeding-up of the total elapsed time for accomplishing the back-up to tape by using the enhanced software involved herein.

Described herein has been an improved system for producing back-ups for a source database. While one embodiment of the invention has been illustrated there may be other embodiments which are still encompassed by the subject invention as described by the following claims.

What is claimed is:

1. A system for enabling multi-Users to operate concurrently for enhancing the function of backing-up data files from a source database means have multiple sources to a storage destination medium means having multiple receiving media comprising:

(a) utility program mans concurrently usable by multiple-Users for copying data files from said source database means by transferring data files via expandable buffer means to a series of data blocks;

(b) means for determining whether the data files are to be destined for a disk storage medium or a tape storage medium);

(c) means for placing (DUMP) said copied data files onto said disk means or tape storage medium means, said means including:

(c1) means for initiating a DUMP to Disk or DUMP to Tape command as selected by a participating User, (c2) means for reading blocks of data files from said source database means a writing said data files onto a destination medium means of multiple Disk or Tape units, said means including;

(c2a) means for selecting the block size by a participating user of selected data files by determining the number of words to be placed in each data block;

(c2b) means for placing the newly-determined-size blocks of data files onto said destination medium.

2. The system of claim 1 wherein said means for initiating a DUMP includes:

(c1a) expanded buffer means for temporarily stories said copied data files in a multiple series of buffers which match the size format of said destination means.

3. The system of claim 1 which includes:

(d) exclusion means for selecting only those data files which have been changed or otherwise identified as requiring transfer since the last dump that had taken place, to be accessed and written to said destination medium means.

4. In a computer system having multiple processors each operating under a Master Control Program with a main memory and I/O module connected to a source database means, a method for instituting a dump for developing a back-up copy of data from said source database means comprising the steps of:

(a) utilizing a utility program available to multiple Users to initiate the copying of data files from said source database means to a destination medium means;

(b) altering the data block size of the destination dump files by selective choice of a participating User for better compatibility of storage on said destination medium means and for reducing the number of I/O's required;

(c) placing said copied data files in their newly-formed block format onto said destination medium means.

5. The method of claim 4 wherein step (a) includes the step of:

(a1) excluding certain selected files from being copied;

(a2) accessing other selected files to be copied due to modified data or earlier incomplete data transfers.

6. The method of claim 5 wherein step (a2) includes the step of:

(a2a) selecting which copied files are to be dumped onto a disk storage destination means.

7. The method of claim 7 wherein step (a2) includes the step of:

(a2b) selecting which copied files are to be dumped onto a Tape storage destination means.

8. The method of claim 4 wherein step (b) includes the step of:

(b1) enabling each User of multiple Users to select the block size of data files to be placed onto said destination medium means.

9. The method of claim 4 wherein step (c) includes the steps of:

(c1) expanding the block size of a temporary storage buffer means from its normal default value;

(c2) utilizing the newly-set block size of data files for placement in an expanded buffer means;

(c3) writing said newly-set block size of data files onto said destination medium means.

* * * * *